(12) United States Patent
Wu

(10) Patent No.: US 8,081,604 B2
(45) Date of Patent: Dec. 20, 2011

(54) METHOD AND APPARATUS FOR HANDLING SRVCC IN AN INTER RADIO ACCESS TECHNOLOGY HANDOVER

(75) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/019,195

(22) Filed: Feb. 1, 2011

(65) Prior Publication Data

US 2011/0206003 A1 Aug. 25, 2011

Related U.S. Application Data

(60) Provisional application No. 61/306,548, filed on Feb. 22, 2010, provisional application No. 61/324,766, filed on Apr. 16, 2010, provisional application No. 61/323,879, filed on Apr. 14, 2010.

(51) Int. Cl.
*H04W 4/00* (2009.01)

(52) U.S. Cl. ..... 370/331; 370/338; 370/466; 455/435.1; 455/436

(58) Field of Classification Search ........... 370/331, 370/336, 466; 455/435.1, 436
See application file for complete search history.

(56) References Cited

U.S. PATENT DOCUMENTS

| 7,382,750 | B2 * | 6/2008 | Wu | 370/331 |
| 7,436,794 | B2 * | 10/2008 | Takahashi et al. | 370/318 |
| 7,647,066 | B2 * | 1/2010 | Takahashi et al. | 455/522 |
| 7,864,722 | B2 * | 1/2011 | Yi et al. | 370/312 |
| 7,885,234 | B2 * | 2/2011 | Ejzak | 370/331 |
| 2004/0117860 | A1 * | 6/2004 | Yi et al. | 725/147 |
| 2005/0003819 | A1 * | 1/2005 | Wu | 455/436 |
| 2005/0083869 | A1 * | 4/2005 | Takahashi et al. | 370/318 |
| 2006/0209675 | A1 * | 9/2006 | Jacobson | 370/216 |
| 2008/0026752 | A1 | 1/2008 | Flore et al. | |
| 2008/0309748 | A1 * | 12/2008 | Franceschini et al. | 348/14.01 |
| 2008/0320526 | A1 * | 12/2008 | Franceschini et al. | 725/62 |
| 2009/0011771 | A1 * | 1/2009 | Takahashi et al. | 455/452.2 |
| 2009/0086674 | A1 * | 4/2009 | Ejzak | 370/331 |
| 2009/0219896 | A1 * | 9/2009 | Hakuli et al. | 370/335 |

(Continued)

FOREIGN PATENT DOCUMENTS

EP 2192804 6/2010

OTHER PUBLICATIONS

3GPP TR 23.856 V0.2.0 (Nov. 2009); 3rd Generation Partnership Project; Technical Specification Group Services and System Aspects; Single Radio Voice Call Continuity (SRVCC) enhancements; Stage 2 (Release 10).*

(Continued)

*Primary Examiner* — Ayaz Sheikh
*Assistant Examiner* — Mounir Moutaouakil
(74) *Attorney, Agent, or Firm* — Perkins Coie LLP

(57) ABSTRACT

The techniques introduced herein provide a system and method for determining whether an inter-RAT handover is an SRVCC handover, and for performing the subsequent SRVCC handover. The techniques include receiving a handover command message that does not include SRVCC related information elements, for example "RAB info to replace," but continuing with an SRVCC handover using a circuit-switched RAB provided in the information for setup. The techniques also include receiving a handover command message that does include SRVCC related information elements and performing the SRVCC handover by an alternative method.

20 Claims, 8 Drawing Sheets

U.S. PATENT DOCUMENTS

| | | | | |
|---|---|---|---|---|
| 2009/0270099 | A1* | 10/2009 | Gallagher et al. | 455/435.1 |
| 2010/0130207 | A1* | 5/2010 | Wu | 455/436 |
| 2010/0202407 | A1 | 8/2010 | Edge | |
| 2010/0279679 | A1* | 11/2010 | Young et al. | 455/423 |
| 2010/0290429 | A1* | 11/2010 | Wu | 370/331 |
| 2010/0296484 | A1* | 11/2010 | Wu | 370/331 |
| 2010/0311386 | A1 | 12/2010 | Edge et al. | |
| 2010/0329243 | A1 | 12/2010 | Buckley et al. | |

OTHER PUBLICATIONS

Handover Support for Converged Inter-RAT Networks; Lazar et al. ICIS 2009, Nov. 24-26, 2009 Seoul, Korea.*

LTE—3GPP Release 8; Apostolis K. Salkintzis, Motorola; Mike Hammer, Cisco; Itsuma Tanaka, NTT DOCOMO Curt Wong, Nokia Siemens Networks; Voice Call Handover Mechanisms in Next-Generation 3GPP Systems; IEEE Communications Magazine o Feb. 2009.*

Rinne, et al., Evaluation of the recent advances of the evolved 3G (E-UTRA) for the VoIP and best effort traffic scenarios, IEEE 8th Workshop on Signal Processing Advances in Wireless Communications (SPAWC 2007), Jun. 17, 2007, p. 1.

Gomez-Barquero, et al., Hopfield Neural Network—Based Approach for Joint Dynamic Resource Allocation in Heterogeneous Wireless Networks, IEEE 64th Vehicular Technology Conference, 2006. (VTC-2006), Sep. 25, 2006, p. 1-5.

Meier-Hellstern, Kathleen S., Network Protocols for the Cellular Packet Switch, IEEE Transactions on Communications, vol. 42, No. 234, Feb. 1994, p. 1235.

Goodman, David J., Packet Transmission and Switching in Advanced Wireless Information Networks, IEEE International Conference on Communications, 1990. (ICC '90), Including Supercomm Technical Sessions (SUPERCOMM/ICC '90), Apr. 16, 1990, p. 1473-1478.

Baishnab, et al., A Very High Efficient Input Shared Buffered Packet Switch for Broadband Wireless Communications, 2009 International Conference on Emerging Trends in Electronic and Photonic Devices & Systems (ELECTRO-2009), Dec. 22, 2009, p. 228.

Zoican, Roxana, Ph. D., On Cellular Packet Switch and Handoffs in Wireless Systems, AFRICON, 1999 IEEE, Sep. 28, 1999, p. 275.

Gelabert, et al., A Markovian Approach to Radio Access Technology Selection in Heterogeneous Multiaccess/Multiservice Wireless Networks, IEEE Transactions On Mobile Computing, vol. 7, No. 10, Oct. 2008, p. 1257.

Wang, et al., Seamless Handover with Buffer Prediction for Wireless Networks Based on IEEE 802.21, International Conference on Information Networking, 2008 (ICOIN 2008), Jan. 23, 2008, p. 1.

Ahmadi, Sassan, An Overview of Next-Generation Mobile WiMAX Technology, Communications Magazine, IEEE, vol. 46, Issue 6, Jun. 2009, p. 84.

3rd Generation Partnership Project; Technical Specification Group Radio Access Network; Radio Resource Control (RRC); Protocol Specification (Release 9); 3GPP TS 25.331 V9.1.0 (Dec. 2009); Jan. 18, 2010.

3rd Generation Partnership Project; Technical Specification Group Services and System Aspects; Single Radio Voice Call Continuity (SRVCC); Stage 2 (Release 9); 3GPP TS 23116 V9.2.0 (Dec. 2009); Dec. 10, 2009.

Samsung; "Stage 2 Clarification Regarding SRVCC;" 3rd Generation Partnership Project (3GPP) 3GPP TSG-RAN2 Meeting #66bis; Jun. 29, 2009-Jul. 3, 2009; pp. 1-8.

HTC; "Clarification on SRVCC;" 3rd Generation Partnership Project (3GPP) 3GPP TSG-RAN2 Meeting #69bis; Apr. 12-16, 2010; pp. 1-6.

* cited by examiner

US 8,081,604 B2

METHOD AND APPARATUS FOR HANDLING SRVCC IN AN INTER RADIO ACCESS TECHNOLOGY HANDOVER

CROSS-REFERENCE TO RELATED APPLICATION(S)

This application claims priority under 35 U.S.C. §119(e) to U.S. Provisional Application No. 61/306,548, titled Method and Apparatus for Handling SRVCC Related Information in Wireless Communication System, filed Feb. 22, 2010, U.S. Provisional Application No. 61/323,879, titled Method and Apparatus for Handling SRVCC Related Information in Wireless Communication System, filed Apr. 14, 2010, and U.S. Provisional Application No. 61/324,766, titled Method and Apparatus for Handling SRVCC Related Information in Wireless Communication System, filed Apr. 16, 2010.

BACKGROUND

In the past few decades, telephone systems have evolved continuously at an accelerated rate. Networks operating under the Universal Mobile Telecommunications System ("UMTS") Long Term Evolution ("LTE") standard, initiated by the third-generation partnership project ("3GPP"), include new radio access technology ("RAT") and core radio network architecture that provide high data rate, low latency, packet optimization, and improved system capacity and coverage. In LTE networks, an evolved universal terrestrial radio access network ("EUTRAN") includes a plurality of evolved Node-Bs ("eNode B"s) and communicates with a plurality of mobile stations, also referred to as user equipments ("UE"s).

Intersystem handovers between LTE networks and Universal Terrestrial Radio Access Networks ("UTRAN") are expected to play an increasingly important role as many cellular network operators will likely provide wide-area coverage with UTRAN and use LTE in relatively small traffic hotspots. This will be particularly common as LTE networks are implemented and expanded. A multisystem UE, e.g., a mobile phone or other wireless device, is capable of working on both LTE and UTRAN systems. Each time the UE moves between the two types of coverage areas, an intersystem handover is performed. These handovers are generally referred to as inter-Radio Access Technology ("inter-RAT") handovers. An inter-RAT handover to UTRAN procedure hands the UE over from an LTE system to a UTRAN system.

Single Radio Voice Call Continuity ("SRVCC") provides voice call continuity in a handover between a packet-switched ("PS") network and a circuit-switched ("CS") network for calls that are anchored in the IP Multimedia Subsystem when the UE is capable of transmitting/receiving on only one of those access networks at a given time. To perform an SRVCC handover from LTE to UTRAN, the LTE network sends a Handover to UTRAN Command Message to the UE.

SUMMARY

The techniques introduced here provide a system and method for determining whether an inter-RAT handover is an SRVCC handover, and for performing the subsequent SRVCC handover. The techniques according to one embodiment include receiving a handover command message that does not include SRVCC related information elements, for example, a "RAB info to replace" information element. Despite the lack of SRVCC related information elements, the UE continues with an SRVCC handover using a circuit-switched RAB provided in a "RAB information for setup" information element.

The techniques include receiving a handover command message that does include SRVCC related information elements, though the SRVCC handover is performed by an alternative method. For example, in one embodiment, a wireless device receives a handover command message containing the "RAB info to replace" information element. The wireless device uses a circuit-switched RAB from the "RAB information for setup" information element to replace the packet-switched bearer currently in use by the wireless device, which is identified by a bearer identity in the "RAB info to replace" information element.

In another embodiment, a handover command message that does not include a "RAB info to replace" information element is considered by the wireless device as invalid. The invalid message is discarded and no handover is initiated. The wireless device may also send a handover failure message to the RAT system.

Other aspects of the techniques summarized above will be apparent from the accompanying figures and the detailed description that follows.

BRIEF DESCRIPTION OF THE DRAWINGS

One or more embodiments of the present invention are illustrated by way of example and not limited by the figures of the accompanying drawings, in which like references indicate similar elements.

DETAILED DESCRIPTION

References in this specification to "an embodiment," "one embodiment," or the like, mean that the particular feature, structure or characteristic being described is included in at least one embodiment of the present invention. Occurrences of such phrases in this specification do not necessarily all refer to the same embodiment.

Figure 1:
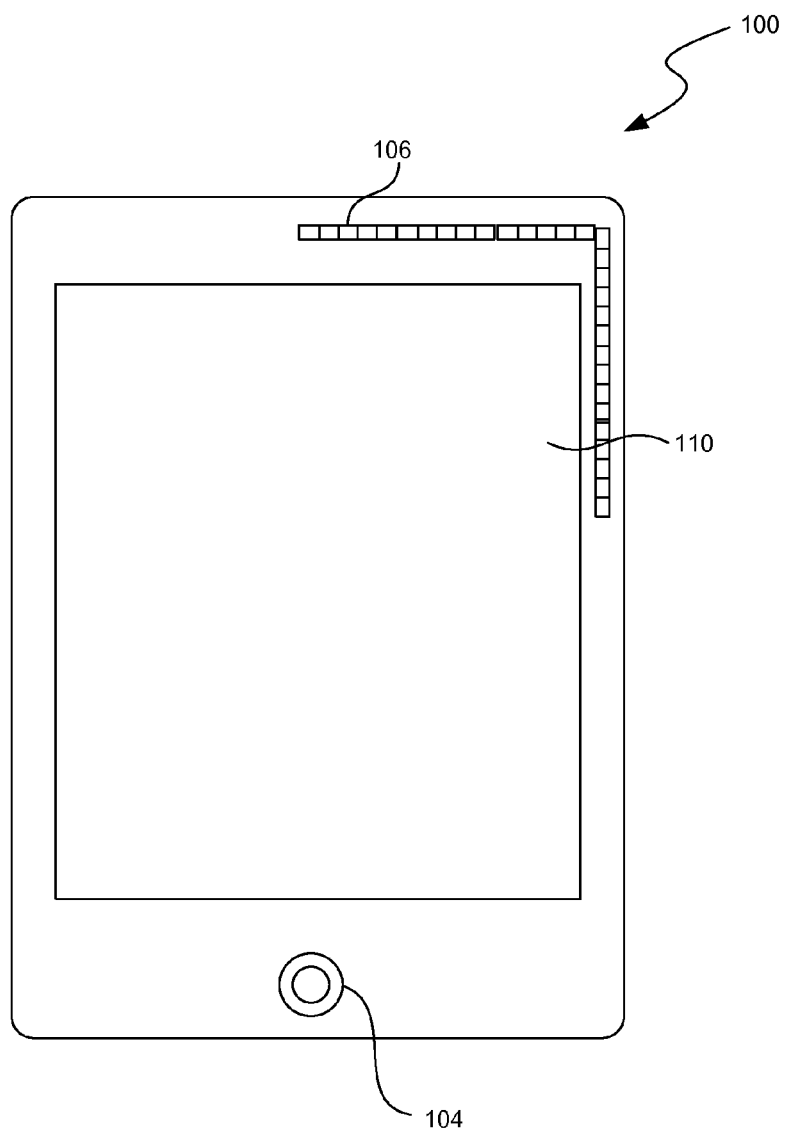
FIG. 1 shows an example of a UE.

FIG. 1 shows an example of a UE 100 in which the techniques introduced here can be implemented. The UE described here is an illustration of one type of wireless device in which the techniques can be implemented; other wireless devices may also be used for implementing the techniques. For example, UEs may include cell phones, personal digital assistants ("PDA"s), portable email devices (e.g., a Blackberry® device), portable media players (e.g., an Apple iPod Touch®), tablet or slate computers (e.g., an Apple iPad®), netbook computers, notebook computers, e-readers, or any other device having wireless communication capability.

The UE 100 includes a display 110 used to make and receive telephone calls and display data services. In some embodiments, the display 110 includes a touch-sensitive screen that allows for the direct manipulation of displayed data. The UE 100 has a multifunction input module 104 to operate the UE, navigate the display, and perform selections on any data. The input module 104 can be, for example, a keyboard, mouse, trackball, touch-sensitive screen, or any other input module capable of communicating a user selection. Additionally, the UE 100 operates an antenna system 106 to send and receive information on a wireless network.

Figure 2:
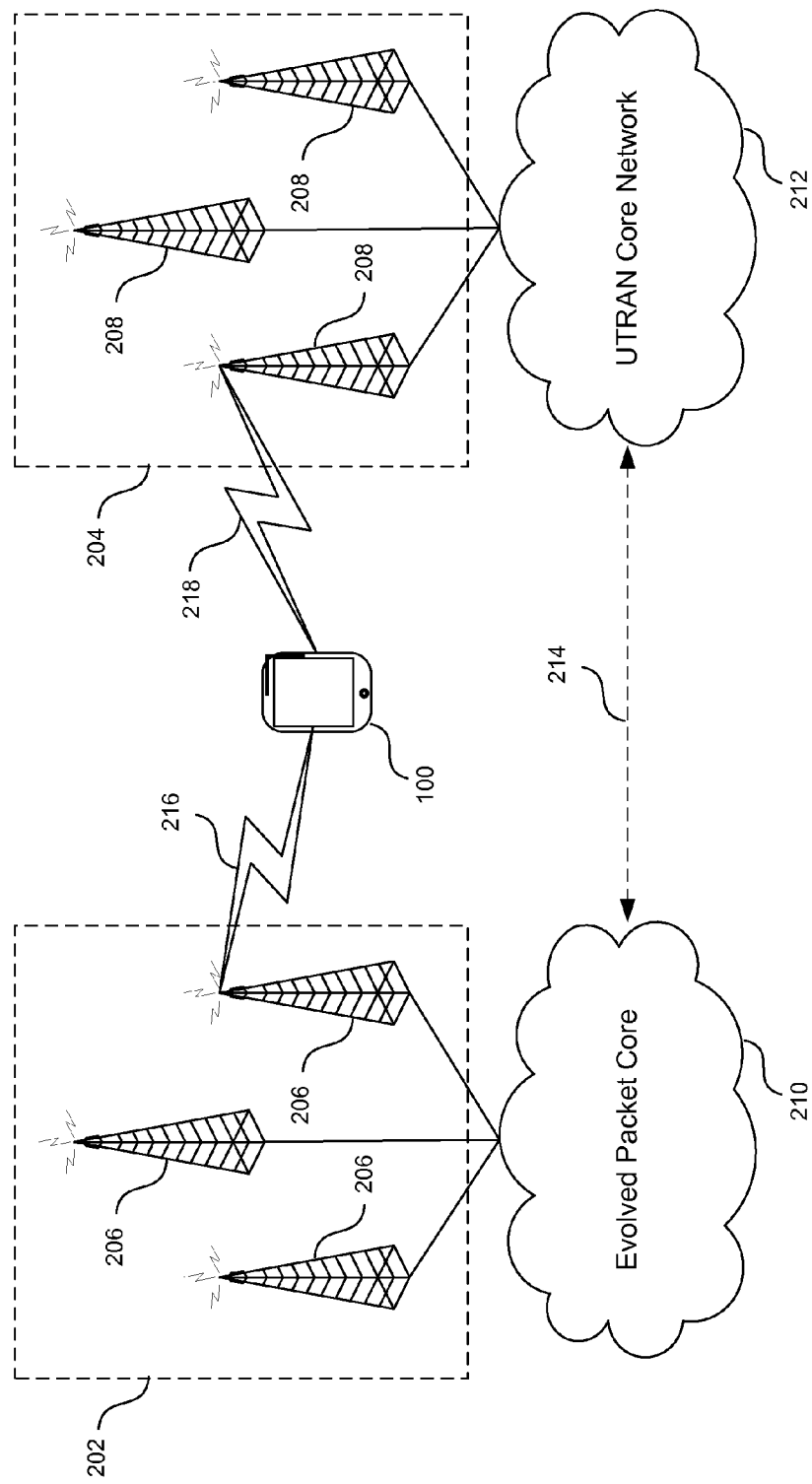
FIG. 2 shows example architecture of an inter-working cellular network.

FIG. 2 shows example architecture of an inter-working cellular network. The example network includes the UE 100, an Evolved UMTS Terrestrial Radio Access Network ("EUTRAN") 202, an UMTS Terrestrial Radio Access Network ("UTRAN") 204, base transceiver stations 206 and 208, evolved packet core ("EPC") 210, and UTRAN core network 212.

The EUTRAN 202 is a wireless communication network using the air interface defined by the 3GPP's LTE standards. EUTRAN is also referred to as the 3GPP work item on the Long Term Evolution and the evolved universal terrestrial radio access (EUTRA) in early drafts of the 3GPP LTE specification. The EUTRAN is a radio access network standard meant to replace the UMTS, High-Speed Downlink Packet Access (HSDPA), and High-Speed Uplink Packet Access (HSUPA) technologies specified in 3GPP releases 5 and beyond. EUTRAN provides higher data rates, lower latency, and is optimized for packet data.

The EUTRAN 202 includes one or more base transceiver stations ("eNode B"s) 206. The eNode Bs 206 communicate with the evolved packet core 210 and other eNode Bs 206 of the EUTRAN 202. The UTRAN 204 includes one or more base transceiver stations ("Node B"s) 208. The Node Bs 208 communicate with the UTRAN core network 212 and other Node Bs 208 of the UTRAN 204. Additionally, the components of the evolved packet core 210 can communicate via a communication infrastructure 214 to network core components using other RATs, for example, UTRAN core network 212.

The communication infrastructure 214 is an interface that is standardized in order to allow multivendor interoperability. In one embodiment, the communication infrastructure 214 can be the Internet (not shown), which allows for the transmission of information in packets over Internet Protocol (IP). In another embodiment, the communication infrastructure 214 can be a serial or parallel transmission line allowing for the transfer of analog and/or digital information between the evolved packet core 210 and the UTRAN core network 212.

UE 100 is a multisystem UE configured to communicate with both the eNode Bs 206 of the EUTRAN 202 and the Node Bs 208 of the UTRAN 204. The UE 100 connects to an eNode B 206 or a Node B 208 using a wireless communication link 216 and 218, respectively. While the UE 100 is configured to communicate in both the EUTRAN 202 and the UTRAN 204, the UE is typically only connected to one network at a time.

Figure 3:
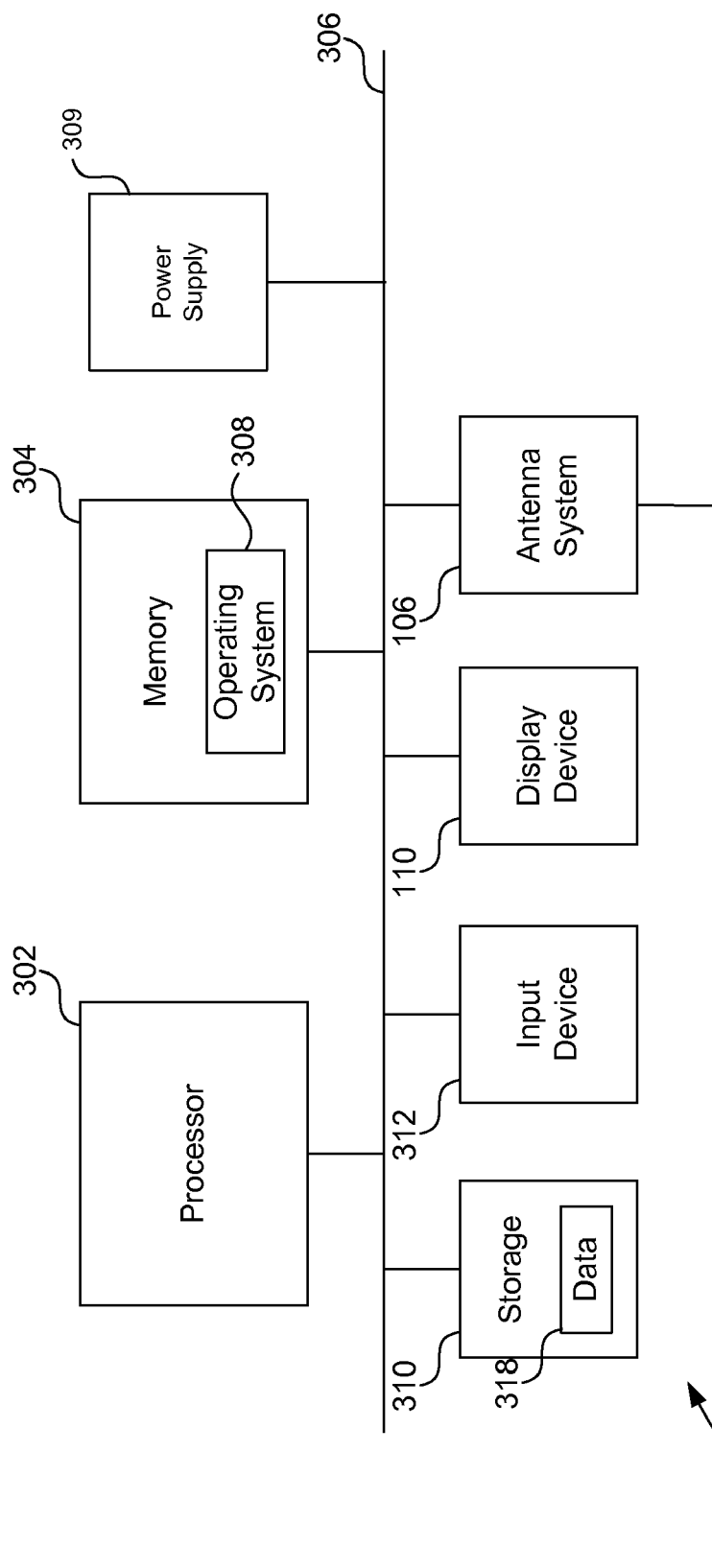
FIG. 3 is a high-level block diagram showing an example of the architecture of a UE.

FIG. 3 is a high-level block diagram showing an example of the architecture of the UE 100. In the illustrated embodiment, UE architecture 300 is a processing system that includes a processor subsystem 302 that can include one or more processors. The UE architecture 300 further includes a memory 304, a storage module 310, an input device 312, a display device 110, and an antenna system 106 each interconnected by an interconnect 306 and powered by a power supply 309.

The UE architecture 300 can be embodied as a single- or multi-processor system that preferably implements a high-level module to send and receive data 318 to and from a base transceiver station, for example, eNode B 206 or Node B 208. The data 318 is communicated via the antenna system 106, which can include a single antenna or multiple antenna system capable of receiving and transmitting data on one or more frequencies. The data 318 can be stored in the storage module 310 so that it can be retrieved by the processor subsystem 302 and memory 304. The data 318 can include, among other things, UE configuration information.

The display device 110 is configured to display information for viewing. Information for display can consist of textual, graphical, and/or multimedia information and is presentable in a graphical user interface. In some embodiments, the display 110 includes a touch-sensitive screen that allows for the direct manipulation of displayed information. The displayed information can also be manipulated by the input device 312. The input device 312 is configured to produce a signal based on user input. The signal may include a user selection that conveys the user input to the processor subsystem 302 and an operating system 308, via the interconnect 306.

The memory 304 illustratively comprises storage locations that can be addressed by the processor subsystem 302 and the UE architecture's other components for storing software program code and data structures associated with the present invention. The processor subsystem 302 and the associated components may, in turn, include processing elements and/or logic circuitry configured to execute the software code and manipulate the data structures. The operating system 308, portions of which are typically resident 304 in memory and executed by the processor subsystem 302, functionally organizes the UE architecture 300 by (among other things) configuring the processor subsystem 302 to invoke handover and proximity indication related operations according to the techniques introduced herein. It will be apparent to those skilled in the art that other processing and memory implementations, including various computer readable storage media, may be used for storing and executing program instructions pertaining to the technique introduced herein.

One skilled in the art will appreciate that a structure similar to system 300 may also be used to operate base transceiver stations 206 and 208. For example, the internal architecture of the base transceiver stations 206 and 208 include a communication module 106, processor subsystem 302, memory 304, and storage module 310, each configured to communicate via an interconnect 306.

Figure 4:
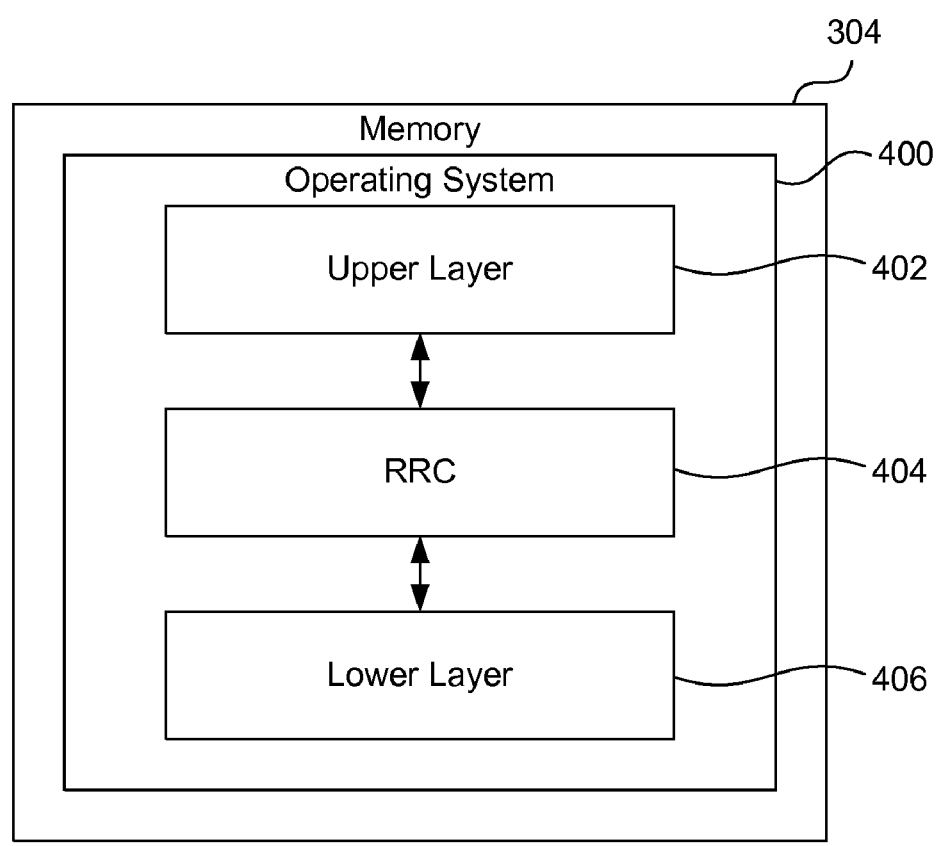
FIG. 4 is a schematic illustration of example architecture of a UE operating system.

FIG. 4 is a schematic illustration of an example architecture of a UE operating system. In one embodiment, the UE memory 304 includes a UE operating system 400. The operating system 400 includes an upper layer 402, a radio resource control (RRC) layer 404, and a lower layer 406. Because the UE 100 is a multisystem device, the operating system 400 will support a protocol stack to communicate with both the UTRAN 204 and EUTRAN 202. The RRC layer 404 is responsible for managing radio resources by communicating with the UTRAN 204 and EUTRAN 202. Relative to the RRC layer 404, there is an upper layer 402 and a lower layer 406, each of which may include multiple protocol layers. The lower layer 406 can include, for example, a radio link control ("RLC") layer. The upper layer can include, for example, a mobility management layer.

Figure 5:
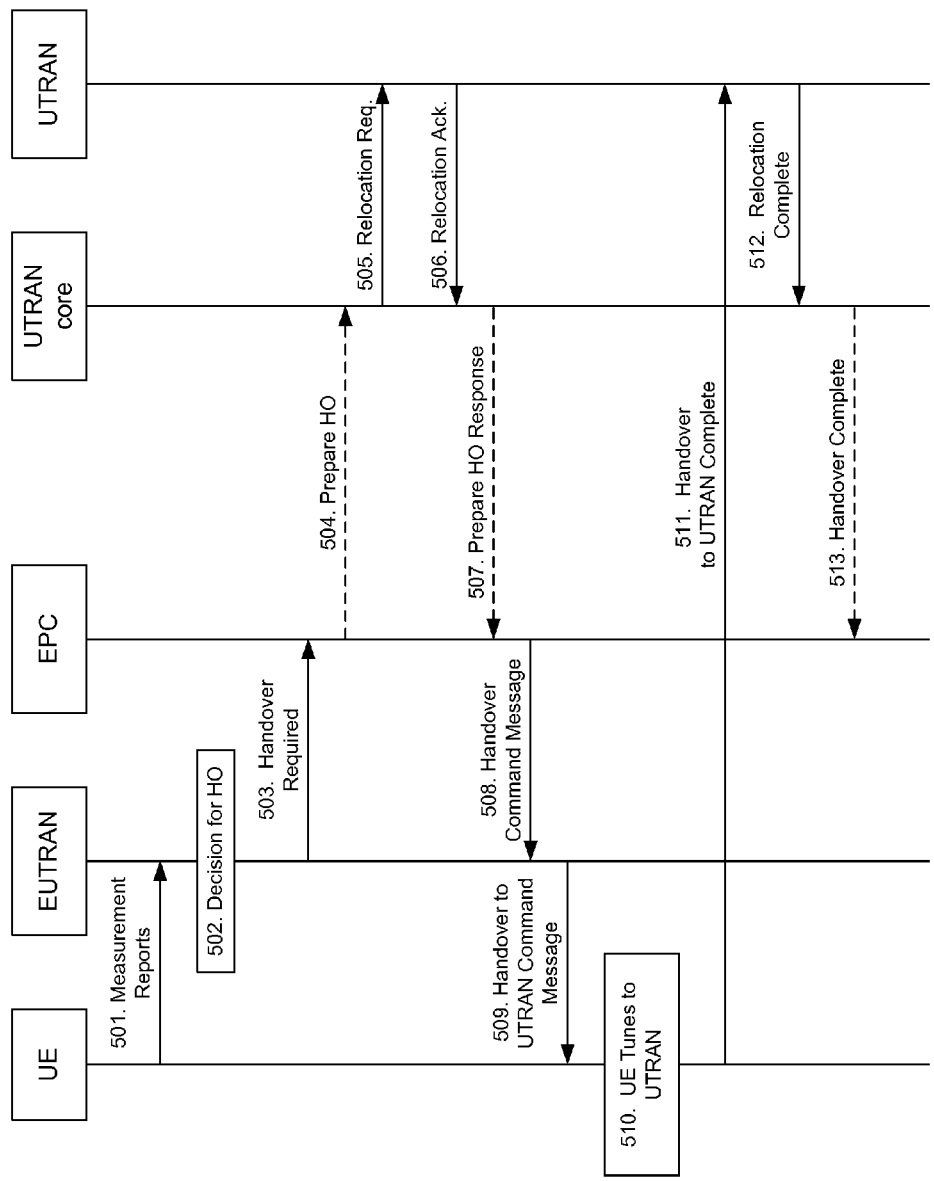
FIG. 5 is an example of a sequence chart for performing an inter-RAT handover procedure.

FIG. 5 is an example of a sequence chart for performing an inter-RAT handover procedure. A typical inter-RAT handover procedure includes additional steps not shown in FIG. 5. An inter-RAT handover procedure from EUTRAN to UTRAN is described fully in 3GPP TS 23.216 version 9.2.0 Release 9 Section 6.2, which is incorporated herein by reference. The sequence of the example handover in FIG. 5 starts at step 501 with the UE taking and submitting measurement reports to the EUTRAN, for example, EUTRAN 202. As the UE moves farther from the EUTRAN, the communication link 216 becomes weaker and the UE updates EUTRAN with measurement reports regarding communication link strength. When the communication link strength reaches a threshold value, beyond which reliable communication is not possible, the EUTRAN decides at step 502 to initiate a handover to UTRAN.

At step 503 the EUTRAN sends a Handover Required Message to the evolved packet core. The Handover Required Message includes an indication that the handover is an SRVCC handover. The SRVCC handover indication tells the EPC that the handover is an SRVCC handover to the CS domain.

The EPC then, at step 504, sends a Prepare Handover Request Message to the UTRAN core. In one embodiment, the Prepare Handover Request Message includes information relating to an EUTRAN radio bearer that the UE is currently using for voice data. The radio bearer carries packet-switched data between the UE and the EUTRAN. The radio bearer used for the voice signal in the EUTRAN connection is commonly referred to as an Evolved Packet System ("EPS") bearer. The evolved packet core 210 performs resource allocation with the target UTRAN by sending a Relocation Request, step 505, and receiving a Relocation Acknowledgment, step 506. The Relocation Acknowledgment, step 506, includes a Handover to UTRAN Command Message containing the prepared CS handover information, such as the radio access bearer ("RAB") information.

In one embodiment, the EPS bearer identity associated with the EPS bearer that was sent from the EPC to the UTRAN through the UTRAN core is used as the bearer identity in the "RAB info to replace" information element in the Handover to UTRAN Command Message. This allows the UE 100, during a handover, to easily swap out the EPS bearer associated with a EPS bearer identity equal to the bearer identity in the "RAB info to replace" information element with the circuit switched RAB. The Handover to UTRAN Command Message is packaged in a target to source transparent container, step 507. The target to source transparent container is used to contain the Handover to UTRAN Command Message in a format that allows the UTRAN and EUTRAN to exchange information in an unchanged form.

Figure 6A:
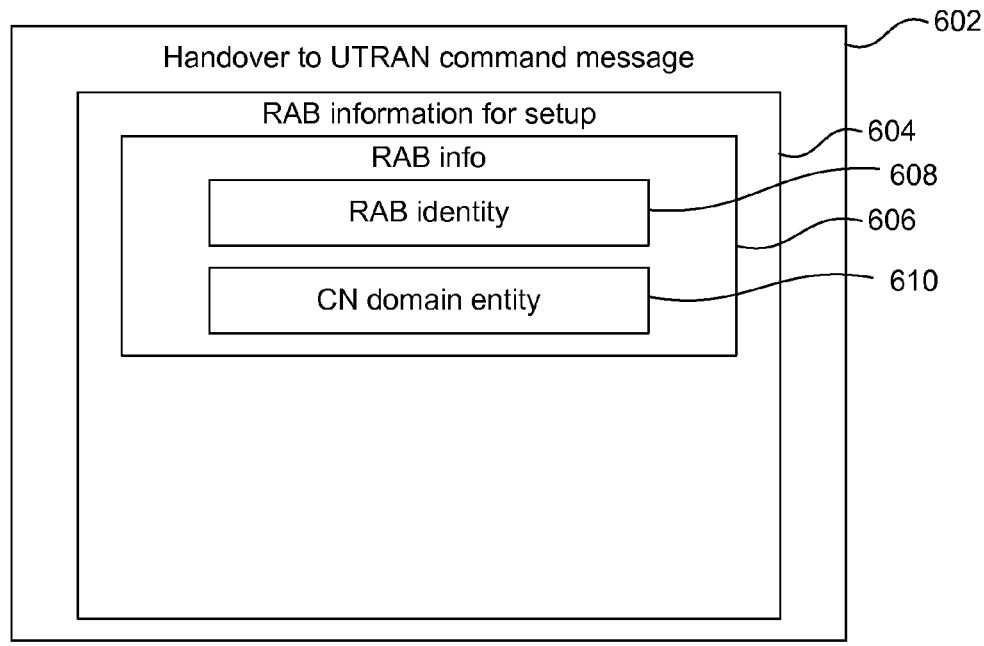
FIG. 6A is an example diagram of a Handover to UTRAN Command Message that does not include an "RAB info to replace" information element.
Figure 6B:
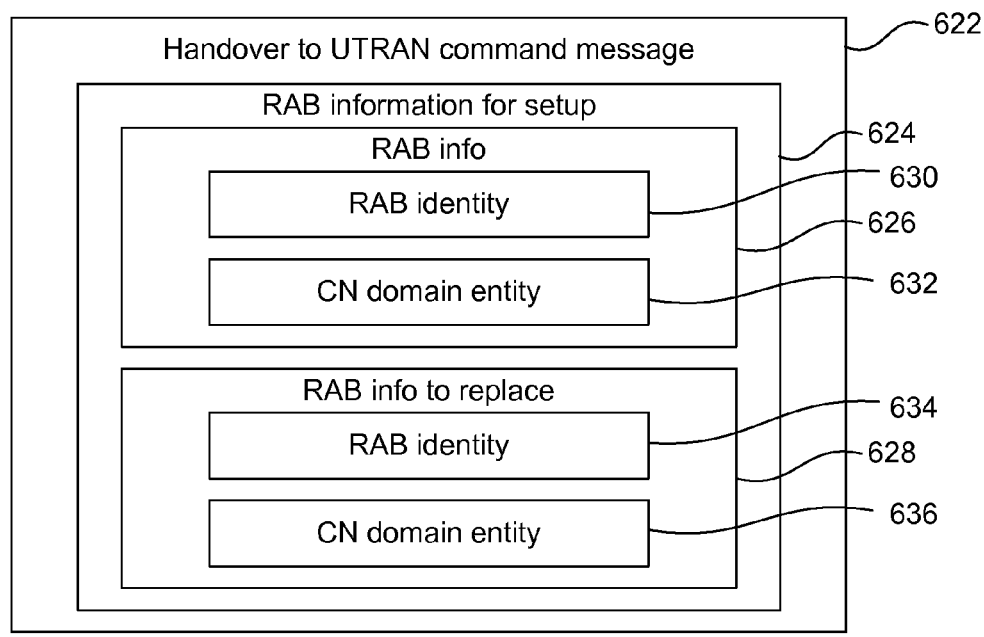
FIG. 6B is an example diagram of a Handover to UTRAN Command Message that does include an "RAB info to replace" information element.

The EPC 210 forwards the Handover Command Message containing the target to source transparent container to the EUTRAN at step 508. At step 509, the EUTRAN extracts the Handover to UTRAN Command Message from the target to source transparent container. The EUTRAN then sends the Handover to UTRAN Command Message to the UE. An example of a Handover to UTRAN Command Message is illustrated in FIGS. 6A and 6B and is described in greater detail below. In response to receiving the Handover to UTRAN Command Message, step 510, the RRC layer 404 of the UE parses the message and determines what connections are being handed over. Having obtained the necessary information from the Handover to UTRAN Command Message, the UE 100 tunes to the UTRAN 204. After connecting to the UTRAN 204, the UE 100 transmits a Handover to UTRAN Complete Message to the UTRAN 204 at step 511. The UTRAN 204 sends a Relocation Complete to the UTRAN core network 212 at step 512. The UTRAN core network 212 then sends a Handover Complete Message to the EPC 210 at step 513.

FIG. 6A is an example diagram of a Handover to UTRAN Command Message 602 that does not include a "RAB info to replace" information element. The Handover to UTRAN Command Message 602 includes, for example, "RAB information for setup" information element 604, which is used by the UE to prepare a connection to the UTRAN 208. The "RAB information for setup" information element 604 includes, among other things, a "RAB info" information element 606. The "RAB info" information element 606 defines a RAB that is to be used when the UE connects to the UTRAN. The "RAB info" information element 606 includes a "RAB identity" information element 608 and a "CN domain identity" information element 610. The "RAB identity" information element 608 uniquely identifies a radio access bearer within a core network ("CN") domain. As described above, in one embodiment the "RAB identity" information element 608 includes a circuit-switched RAB that has the same identity as the EPS bearer that is used between the UE 100 and EUTRAN 202. This allows the UE 100, during a handover, to easily swap the EPS bearer with the circuit-switched RAB that has the same identity. The "CN domain entity" information element 610 identifies the type of core network domain that the UTRAN employs.

FIG. 6B is an example diagram of a Handover to UTRAN Command Message 622 that includes a "RAB info to replace" information element 628. The example handover message of FIG. 6B includes similar elements to those of the handover message of FIG. 6A. In particular, the Handover to UTRAN Command Message 622 includes a "RAB information for setup" information element 624 and a "RAB info" information element 626, which includes a "RAB identity" information element 630 and a "CN domain entity" information element 632. However, the Handover to UTRAN Command Message 622 of FIG. 6B further includes the "RAB info to replace" information element 628. The "RAB info to replace" information element 628 includes information to be used in completing the handover. For example, the information element includes an indication of the EPS bearer currently used for the EUTRAN voice connection. This indication lets the UE 100 know which EPS bearer is to be replaced with the circuit-switched RAB associated with the UTRAN connection that is received in the handover message. Similar to the "RAB info" information element 626, the "RAB info to replace" information element includes a RAB identity 634 (i.e., the EPS bearer to be replaced) and a CN domain entity 636.

Figure 7:
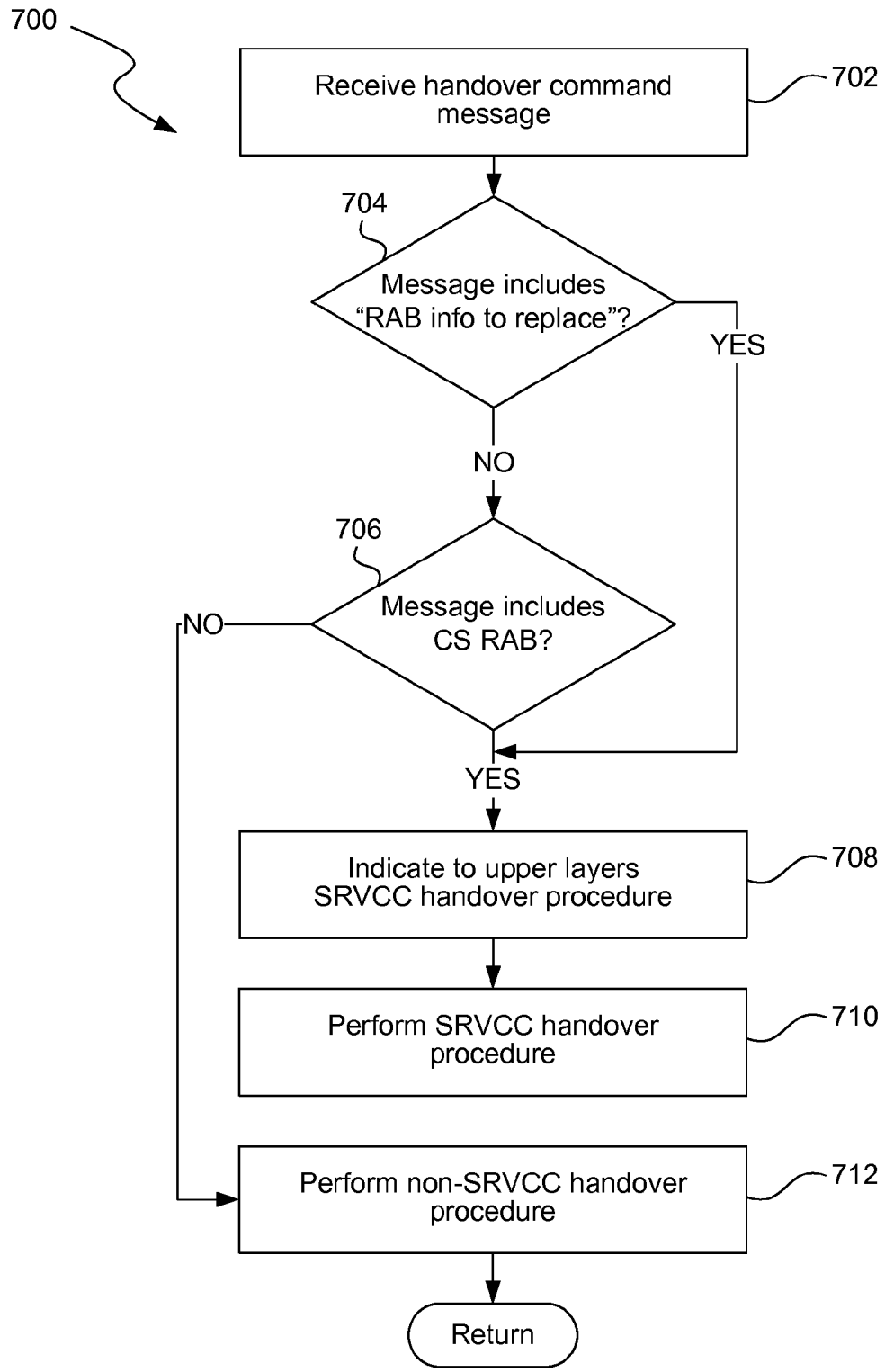
FIG. 7 is a flow diagram of a process for inter-RAT handover.

FIG. 7 is a flow diagram of a process for inter-RAT handover. The process is organized as a sequence of operations in the flowchart 700. However, it should be understood that at least some of the operations associated with this process can potentially be reordered, supplemented, or substituted for while still performing the same overall technique.

In the example of FIG. 7, a first RAT, for example EUTRAN 202, has established a packet-switched service with a UE 100. In one embodiment, the packet-switched service is a voice call. The process begins at step 702, where the UE 100 receives a handover command message from the first RAT. In one embodiment, where the first RAT is an EUTRAN 202 and the handover is to take place to a second RAT that is a UTRAN 204, the handover command message is a Handover to UTRAN Command Message.

The lower layer 406 of the UE 100 receives the handover command message and passes the handover command message to the RRC layer 404. Upon receiving the handover command message, the RRC layer 404 determines, at decision step 704, whether the handover command message includes a "RAB info to replace" information element. If the handover command message includes a "RAB info to replace" information element, the process continues to step 708 where the RRC layer 404 indicates to the upper layer 402 of the UE 100 that the handover is an SRVCC handover procedure. At step 710, the UE then performs the SRVCC handover procedure from the first RAT to the second RAT.

However, if the RRC layer 404 determines, at decision step 704, that the handover command message does not include the "RAB info to replace" information element, processing proceeds to decision step 706. At decision step 706, the RRC layer 404 determines whether the handover command message includes a circuit-switched RAB (CS RAB) in the "RAB information for setup" information element. If the "RAB information for setup" information element does not include a CS RAB, the RRC layer 404 determines that the handover procedure is not an SRVCC handover and, at step 712, the UE performs a non-SRVCC handover procedure. However, if the "RAB information for setup" information element does include a CS RAB, the process continues to step 708, where the RRC layer 404 indicates to the upper layer 402 of the UE 100 that the handover is an SRVCC handover procedure. At step 710, the UE then performs the SRVCC handover procedure from the first RAT to the second RAT.

Figure 8:
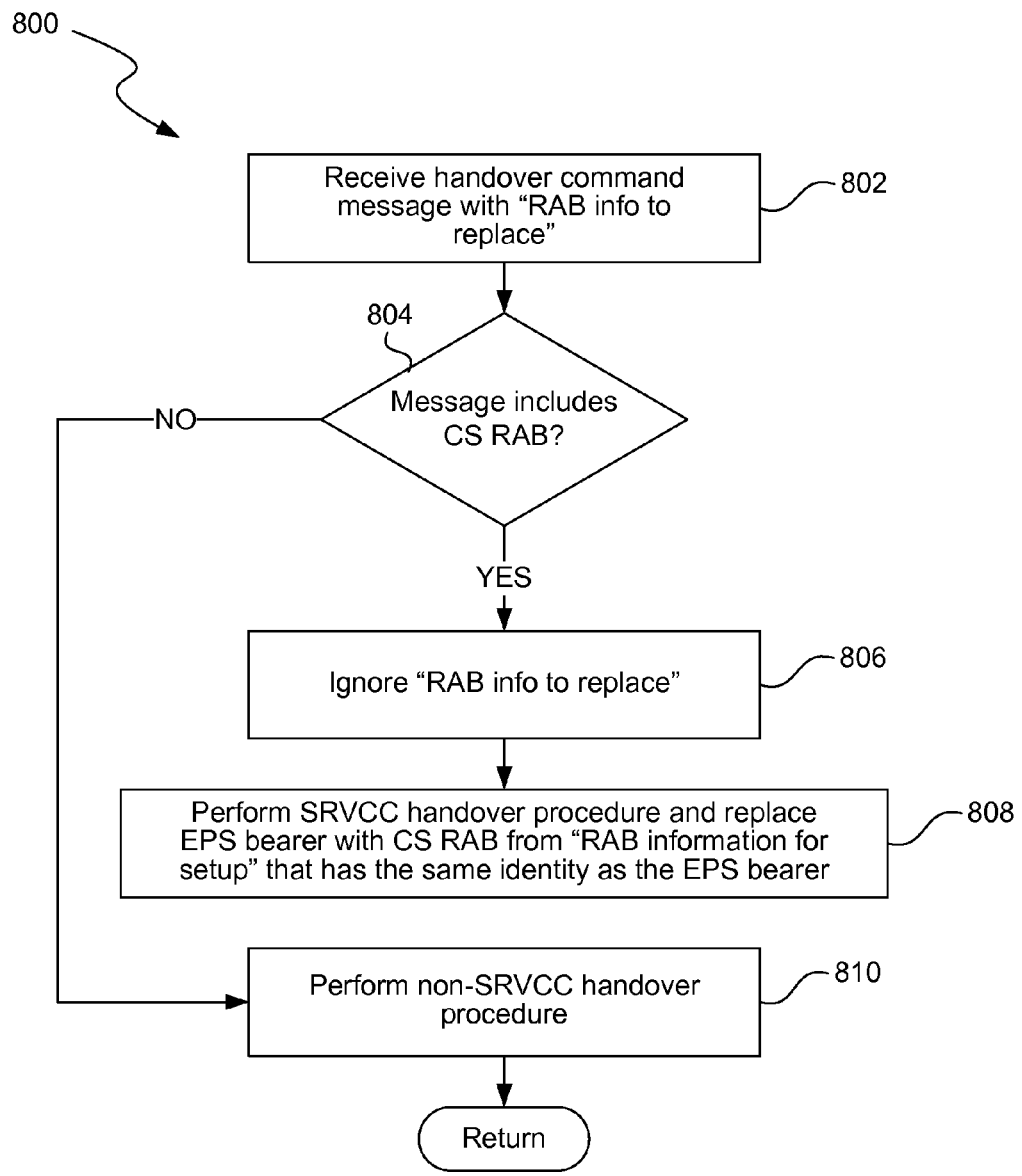
FIG. 8 is a flow diagram of an alternative process for inter-RAT handover.

FIG. 8 is a flow diagram of an alternative process for inter-RAT handover. The process is organized as a sequence of operations in the flowchart 800. However, it should be understood that at least some of the operations associated with this process can potentially be reordered, supplemented, or substituted for while still performing the same overall technique.

In the example of FIG. 8, a first RAT, for example, EUTRAN 202, has established a packet-switched service with a UE 100. In one embodiment, the packet-switched service is a voice call. The process begins at step 802, where the UE 100 receives from the first RAT a handover command message that includes a "RAB info to replace" information element. In one embodiment, where the first RAT is EUTRAN 202 and the handover is to take place to a second RAT that is a UTRAN 204, the handover command message is a Handover to UTRAN Command Message.

The lower layer 406 of the UE 100 receives the handover command message with the "RAB info to replace" information element and passes the handover command message to the RRC layer 404. Upon receiving the handover command message, at decision step 804, the RRC layer 404 determines whether the "RAB information for setup" information element includes a CS RAB. If the "RAB info to replace" information element does not include a CS RAB, the RRC layer 404 determines that the handover is not an SRVCC handover and, at step 810, the UE performs a non-SRVCC handover procedure. However, if the "RAB information for setup" information element does include a CS RAB, the process continues to step 806, where the RRC layer 404 determines that the handover is an SRVCC handover but ignores the "RAB info to replace" information element. At step 808, instead of using the "RAB info to replace" information element for the SRVCC handover, the UE 100 replaces the current EPS bearer with a CS RAB in the "RAB information for setup" information element that has the same identity as the current EPS bearer. First, the RRC layer 404 determines a bearer identity for the EPS bearer that is currently used for voice service in the first RAT. The UE 100 then finds the CS RAB in the "RAB information for setup" information element that has a corresponding bearer identity, and replaces the EPS bearer with the CS RAB.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

I claim:

1. A method for performing an inter-radio access technology ("Inter-RAT") handover procedure, the method comprising:
   establishing a packet-switched (PS) service between a wireless device and a first RAT system;
   receiving a network directed handover command message from the first RAT system, wherein the network directed handover command message includes circuit-switched radio access bearer (CS RAB) configuration information for a second RAT system but does not include single radio voice call continuity (SRVCC) related information;
   determining that the network directed handover command message does not include SRVCC related information;
   determining, based on the presence of CS RAB configuration information, that an SRVCC handover procedure should be performed; and
   performing the SRVCC handover procedure from the first RAT system to the second RAT system by switching transfer of data from a PS radio access bearer of the PS service in the first RAT system to a CS RAB in the second RAT system, wherein the CS RAB is included in the CS RAB configuration information.

2. The method of claim 1 wherein determining that the network directed handover command message does not include SRVCC related information includes determining that the network directed handover command message does not include a "RAB info to replace" information element.

3. The method of claim 1 wherein the CS RAB configuration information includes a "RAB information for setup" information element and wherein the "RAB information for setup" information element includes CS RAB information.

4. The method of claim 1 wherein the network directed handover command is a Handover to UTRAN Command Message.

5. The method of claim 4 wherein the first RAT system receives the Handover to UTRAN Command Message from the second RAT system.

6. The method of claim 1 wherein the first RAT system is a long term evolution (LTE) system.

7. The method of claim 1 wherein the second RAT system is a universal mobile telecommunications system (UMTS) system.

8. A method for performing an inter-radio access technology (Inter-RAT) handover procedure, the method comprising:
   establishing a packet-switched (PS) service between a wireless device and a first RAT system;
   receiving at the wireless device a network directed handover command message directing a handover from the first RAT system to a second RAT system, wherein the network directed handover command message includes circuit-switched radio access bearer (CS RAB) configuration information but does not include single radio voice call continuity (SRVCC) related information;
   determining that the network directed handover command message does not include SRVCC related information;
   identifying, by the wireless device, that the network directed handover command message is invalid; and
   discarding the invalid message without acting on the command.

9. The method of claim 8 wherein determining that the network directed handover command message does not include SRVCC related information includes determining that the network directed handover command message does not include a "RAB info to replace" information element.

10. The method of claim 8 wherein the CS RAB configuration information includes a "RAB information for setup" information element.

11. The method of claim 10 wherein the "RAB information for setup" information element includes CS RAB information.

12. The method of claim 8 wherein the network directed handover command message is generated by the second RAT system.

13. The method of claim 12 wherein the network directed handover command message is received by the first RAT system from the second RAT system and wherein the network directed handover command message is forwarded from the first RAT system to the wireless device.

14. The method of claim 8 further comprising sending a network directed handover failure message to the first RAT system.

15. The method of claim 8 wherein the first RAT system is a long term evolution (LTE) system and the second RAT system is a universal mobile telecommunications system (UMTS).

16. A method for performing an inter-radio access technology (Inter-RAT) handover procedure, the method comprising:
   establishing a packet-switched (PS) service between a wireless device and a first RAT system;
   receiving at the wireless device a network directed handover command message from the first RAT system, wherein the network directed handover command message includes circuit-switched radio access bearer (CS RAB) configuration information and a "RAB info to replace" information element;
   switching the transfer of data from an evolved packet system (EPS) bearer used for the PS service to a CS RAB specified by the CS RAB configuration information; and
   wherein a RAB identity in the "RAB info to replace" information element is equal to an EPS bearer identity of the EPS bearer.

17. The method of claim 16 wherein the CS RAB configuration information includes a "RAB information for setup" information element.

18. The method of claim 17 wherein the "RAB information for setup" information element includes information specifying the CS RAB.

19. The method of claim 16 wherein the network directed handover message is generated by a second RAT system and the network directed handover message includes the RAB identity in the "RAB info to replace" information element that is equal to the EPS bearer identity received by the second RAT system from the first RAT system.

20. The method of claim 19 wherein the EPS bearer identity received by the second RAT system from the first RAT system is the EPS bearer identity of the EPS bearer used for the PS service in the first RAT system.

* * * * *